A. SCHUHKNECHT.
Belt Fastening.
No. 229,278.　　　　　Patented June 29, 1880.
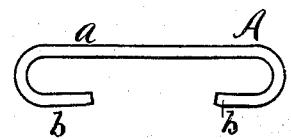
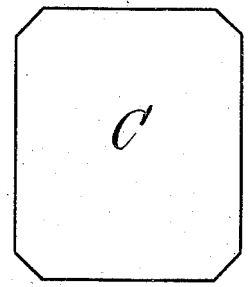
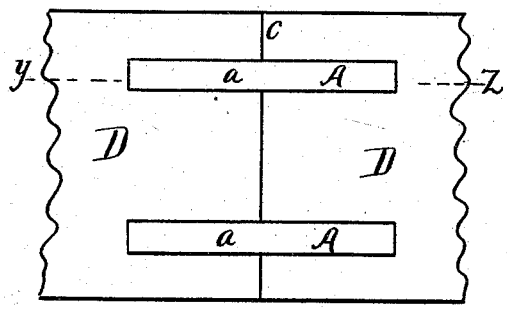
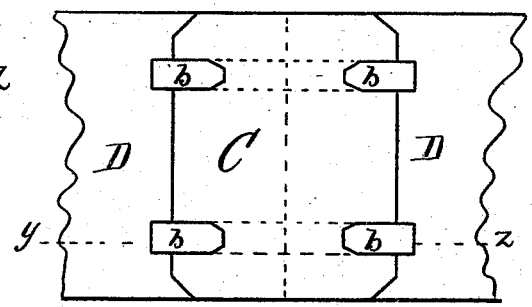
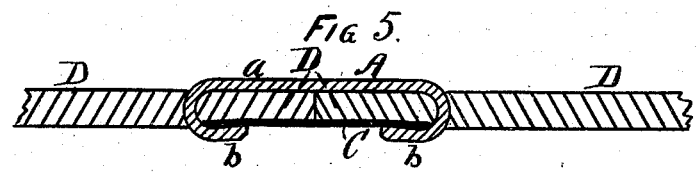
WITNESSES.
Samuel D. Kelley
Arthur D. McClellan
INVENTOR.
Adolph Schuhknecht
By Porter & Hutchinson
Attys

UNITED STATES PATENT OFFICE.

ADOLPH SCHUHKNECHT, OF CHELSEA, MASSACHUSETTS.

BELT-FASTENING.

SPECIFICATION forming part of Letters Patent No. 229,278, dated June 29, 1880.

Application filed January 20, 1880.

*To all whom it may concern:*

Be it known that I, ADOLPH SCHUHKNECHT, of the city of Chelsea, State of Massachusetts, have invented an Improvement in Belt-Fastenings, of which the following is a specification.

The object of my invention is to improve the belt-fastening known as the "belt-hook" fastening; and the invention consists in combining with such hooks a metallic plate of a width equal to that of the belt, and as long as can be inserted within the hooks, so that when the latter are inserted in place in the belt and the plate is in position the points of the hooks are clinched down firmly upon the plate, which latter is slightly indented thereby into the belt, thus rendering the ends of the belt at the abutting joint as firm and rigid, when subjected to edge pressure, as all other parts thereof.

Figure 1 is an edge elevation of the common belt-hook. Fig. 2 is a plan view of the metallic plate which I combine with the hooks. Fig. 3 is a top-plan view of a belt, showing the hooks as inserted in place. Fig. 4 is an under-side plan view of a belt, showing the hooks and plate in position. Fig. 5 is a longitudinal vertical section as taken on line $y\,z$, Figs. 3 and 4, and showing the relative positions of the ends of the coupled belt, the hooks, and plate.

In these figures, A represents the belt-hook, which is formed with body or bar $a$ and the curved hooks $b\,b$, wherein the ends of the bar terminate. As this hook is old and well known, a further description of its form, materials, or proportion is not deemed necessary.

C represents my metallic plate, which may be formed of brass, copper, zinc, or iron; but I prefer tinned iron, known to the trade as "tin-plate," of suitable thickness, for such purpose. I cut this plate of a width equal to that of the belt to be coupled and as long as can be inserted inside of the hooks $b\,b$. After the requisite holes are punched in the ends D D of the belt, and the hooks are inserted therein, the plate C is slid in under the points $b\,b$, as shown in Fig. 4, when the ends $b$ are clinched down firmly upon the plate, and so as to slightly embed the same at the hook ends in the belt. The plate, by furnishing the requisite bearing upon the belt, serves to economize the full pressure resulting from clinching the hooks, as it is compressed firmly between the plate and the backs $a$ of the hooks, and in a long belt thus coupled, when run slack, as is often done, the ends are not chafed and worn weak by the abrading action of the hooks, as the ends of the belt are held immovable relatively to each other, and no action takes place between the belt and the hooks. The plate also protects the edges of the belt at the joint $c$ from the usual injurious action of the iron pins in the shipper-bar, which otherwise rapidly destroys the exposed ends of the belt.

It will be obvious that a similar plate may be employed on both sides of the belt at the joint; but with the broad and joint-lapping bearing of the backs $a$ of the hooks a plate thereon is not necessary.

It will be apparent that my plate can be used upon belts requiring one or any greater number of hooks.

I claim as my invention—

A belt-fastening consisting of the hook or hooks A, formed with the back $a$ and inturned ends $b\,b$, and a metallic plate, C, of a length to be inserted and secured within the said ends $b\,b$ by clinching the same, and adapted to be applied to and unite the ends D D of the belt, and to serve as a guard and support thereto, substantially as specified.

ADOLPH SCHUHKNECHT.

Witnesses:
T. W. PORTER,
A. G. PORTER.